United States Patent [19]
Süess et al.

[11] Patent Number: 5,964,528
[45] Date of Patent: Oct. 12, 1999

[54] METHOD OF OPERATING A MASS EXCHANGE COLUMN, A HEAT EXCHANGE COLUMN OR A STATIC MIXER USING A PACKING COMPOSED OF FLAT STRUCTURAL ELEMENTS

[75] Inventors: Philipp Süess, Neftenbach; Raymond Charles Plüss, Kleinandelfingen, both of Switzerland

[73] Assignee: Sulzer Chemtech AG, Winterthur, Switzerland

[21] Appl. No.: 08/803,884

[22] Filed: Feb. 20, 1997

Related U.S. Application Data

[62] Division of application No. 08/383,140, Feb. 3, 1995, Pat. No. 5,629,258.

[51] Int. Cl.⁶ .................................................. B01F 5/06
[52] U.S. Cl. .......................................... 366/337; 165/115
[58] Field of Search .................................. 366/337, 336, 366/339, 340; 261/113, DIG. 72; 165/109.1, 115, 76, DIG. 163

[56] References Cited

U.S. PATENT DOCUMENTS

| | | | |
|---|---|---|---|
| 4,374,542 | 2/1983 | Bradley | 366/337 |
| 4,497,752 | 2/1985 | Huber | 366/337 |
| 4,497,753 | 2/1985 | Streiff | 366/337 |
| 5,063,000 | 11/1991 | Mix | 366/337 |
| 5,215,375 | 6/1993 | Ditzler et al. | 366/337 |

Primary Examiner—Tony G. Soohoo
Attorney, Agent, or Firm—Townsend and Townsend and Crew LLP

[57] ABSTRACT

A method of operating a mass exchange column, a heat exchange column, or a static mixer. The method includes providing a packing wherein assembly of the packing includes providing at least one flat, structural element including a plurality of separate adjoining strips of a sheet material. Each strip has first and second spaced-apart longitudinal edges with longitudinal edges of adjoining strips being placed opposite each other. The adjoining strips are in contact with and secure to each other where they contact each other to provide the flat structural element with structural stability. The longitudinal edges of the strips include a plurality of repetitively spaced-apart recesses of a predetermined shape and the recessed in longitudinal edges are opposite to each other to define a multiplicity of repetitively arranged openings distributed over the structural element. At least some of the structural elements are folded along fold lines to give the folded structural elements a zigzag shape in a cross-section transverse to the fold lines. The folded structural elements are assembled in the layers to thereby form the packing. The packing is installed in an apparatus and a trickle film and a gas stream is flowed over the packing.

6 Claims, 8 Drawing Sheets

METHOD OF OPERATING A MASS EXCHANGE COLUMN, A HEAT EXCHANGE COLUMN OR A STATIC MIXER USING A PACKING COMPOSED OF FLAT STRUCTURAL ELEMENTS

RELATED APPLICATIONS

This is a divisional patent application of application Ser. No. 08/383,140, filed Feb. 3, 1995, now U.S. Pat. No. 5,629,258, for a Flat Structural Element and A Packing Composed of Such Structural Elements.

BACKGROUND OF THE INVENTION

1. Field of the Invention

The invention relates to flat structural elements having a plurality of openings distributed according to a predetermined pattern and a packing composed of such structural elements.

2. Description of the Prior Art

From WO 90/10497 is known a vortex packing (multiple vortex mixing insert) which may be built up of layers of zigzag-folded metal sheets, the so-called pleated mats. The layers are parallel to an axis, the apparatus axis, while the folding edges are inclined to this axis. The layers are alternately so arranged that a system of channels is produced which often cross each other. The unfolded metal sheets have a chessboard-like pattern of substantially rhombic fields one half of which has the form of apertures. The other half forms structural elements of the packing. The open fields are somewhat smaller so that they have the form of island-like openings, and the closed fields are connected to each other at vertices by linear overlappings. The open fields form in the packing a second system of channels which often cross each other, the second system extending transversely to the first system. The folding edges extend—in the direction of the overlappings—along one part of the field margins.

In the known packing, the apertures in the metal sheets in the layers are made by stamping-out processes. It is mainly disadvantageous that nearly half of the starting material is lost and in addition, due to the expense involved with the stamping tools, there are limitations on the shape of the openings desirable as regards the method.

SUMMARY OF THE INVENTION

The aim of the invention is to devise flat structural elements of all possible shapes adaptable optimally to the particular requirements of the method which result in the smallest possible loss of material and enable production of layered packing from these flat structural elements, particularly packings which may be used in a most versatile manner.

It is particularly important that, due to the intermediate step of formation of individual strips of flat material and their interconnection according to a defined relative displacement, not only loss of material is widely avoided but it is at the same time achieved that by the choice of special extension of cutting lines a considerable freedom is obtained as regards the position, size, shape and distribution of the openings in the flat structural elements. By suitable folding and corresponding choice of the extension of folding edges three-dimensional flat structures may be created from these flat structural elements, which are advantageously suitable for the formation of layered systems, particularly formation of packings and especially for the formation of vortex packings.

DETAILED DESCRIPTION OF THE PREFERRED EXEMPLARY EMBODIMENTS

The basic construction of a vortex packing (multiple vortex mixing insert) composed of flat structural elements will be explained with the help of FIGS. 1 to 3.

The illustrated vortex packing is an ordered packing having a fan-like arrangement of guiding surfaces, which deflect the flow media from their direction of main flow to all sides and mix together adjacent partial streams. The guiding surfaces are the structural elements of the packing. To the lattice planes, which are situated perpendicularly to the axis of the apparatus, correspond two different layers of octahedra. In one of the layers the octahedron faces are alternately open and closed, while in the other layer all the octahedra have open faces. The layers are interlinked such that the octahedra of adjacent layers of the same kind meet at their polar vertices. The octahedra fill out only two-thirds of the space; the spaces between them are formed by tetrahedra. The vertex packing is composed of face-shaped structural elements. These structural elements define a point lattice whose lattice planes, which extend perpendicularly to the apparatus axis, form a base grid of quadrilaterals. The quadrilaterals represent always an equatorial periphery of an octahedron and the polar vertices of these octahedra lie on the points of the adjacent lattice planes.

In the special case where the structural elements are rhombuses with an acute angle of 60°, the point lattice associated with the vertex packing is a face-centered cubic lattice. This is shown in FIG. 1; the unit cell of the lattice is the cube with vertices A, B, C, D, K, L, M and N and with face centers E, F, G, H, I and F' (see also FIG. 3 with a cube stretched in the direction A-B). The shown section of the packing is composed of two zigzag-folded faces 1 and 2 provided with rhombic apertures, which are shown in their unfolded state in FIGS. 2a and 2b. The hatched faces (e.g. a and d) are the closed faces; the remaining faces represent the apertures. The arrows 10 indicate the direction and position of the folding edges. In order to make the structure shown in FIG. 1 in practice, it is necessary—as already mentioned—to connect the closed rhombic faces at their corners by linear overlappings (see FIG. 4 of WO 90/10497). Here the connection between the structural elements is shown, for simplicity, as a connection at points.

Figures 1, 2A, 2B, 3:
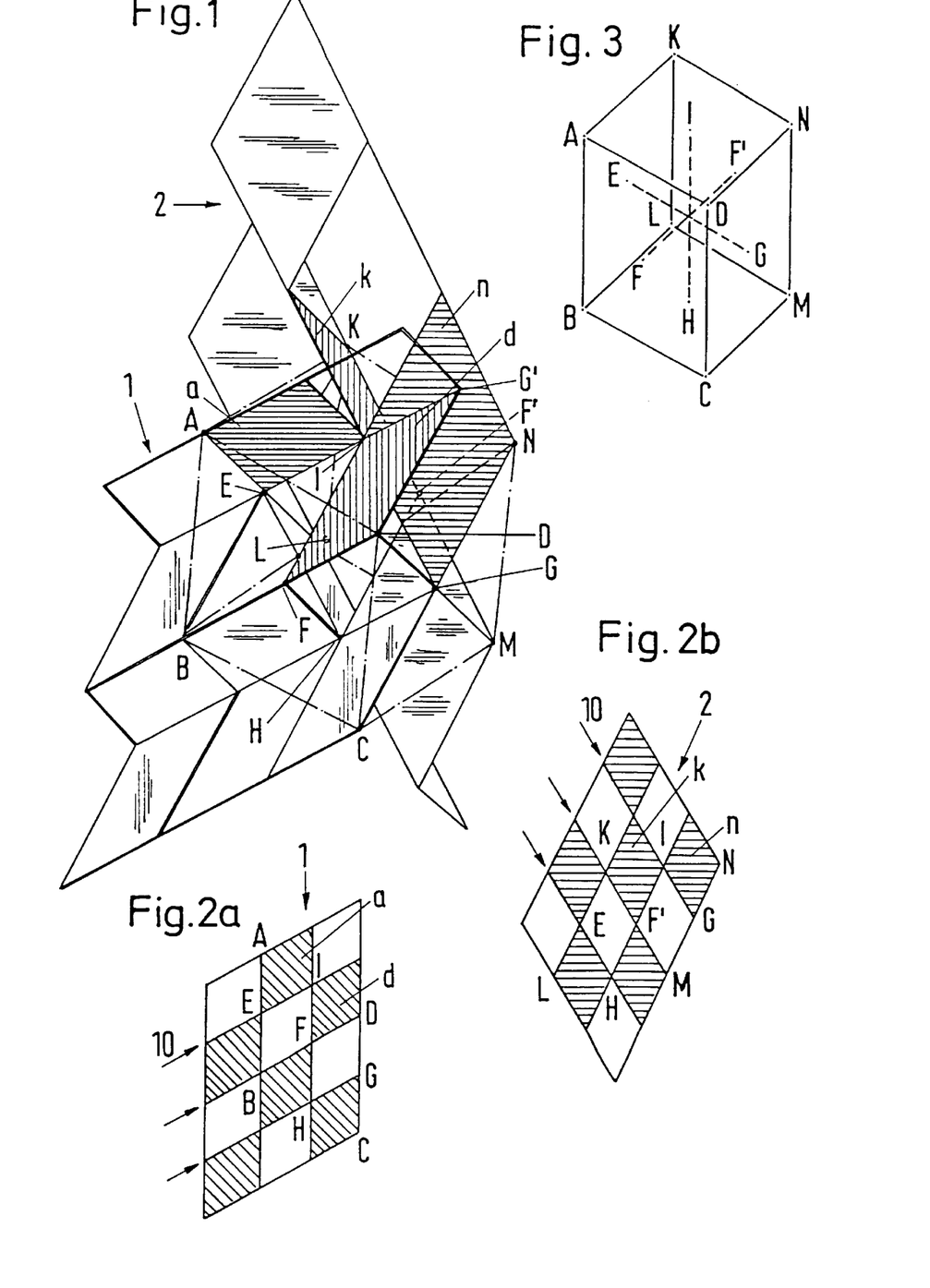
FIG. 1 is a section of a known vortex packing.
FIGS. 2a, 2b show two areas with rhombic fields which, after zigzag folding, result in the structure of FIG. 1.
FIG. 3 shows an elementary cell of a point lattice.

In FIG. 1 the faces a, d, n and k are particularly emphasized by hatching: They form a fan-like arrangement of guiding surfaces (direction of main flow is H–I). The octahedron delimited by face centers E, . . . F' is a regular octahedron of the kind having all faces open. Between the two faces d and n is situated an octahedron (only a half of which is shown) of the other kind (alternately open and closed faces); the vertices of this half are I, D, G, N and G'.

The drawings, with reference to which the structures according to the invention will now be described, show the face-centered cubic special case. But also the generalization is valid that the unit cell A, . . . N is not cubic but is a parallelepiped, for instance a cuboid, as is shown in FIG. 3 (the edge AB is longer than the edges BC and AK).

The structure shown in FIG. 1 represents the ideal case in which the guiding surfaces a, d, k and n meet exactly at a point I. If the two faces 1 and 2 are displaced with respect to each other in the direction of the layers (i.e. in the direction of the plane which is defined by points A, B and C), there is, in general, a deviation from the ideal case. Even in the case of such a deviation the advantages of the vortex packing are to a certain degree preserved. This applies also when the faces 1 and 2 are arbitrarily arranged next to each other. The invention encompasses also these cases in which the ideal case is not present.

Figures 4, 5, 6:
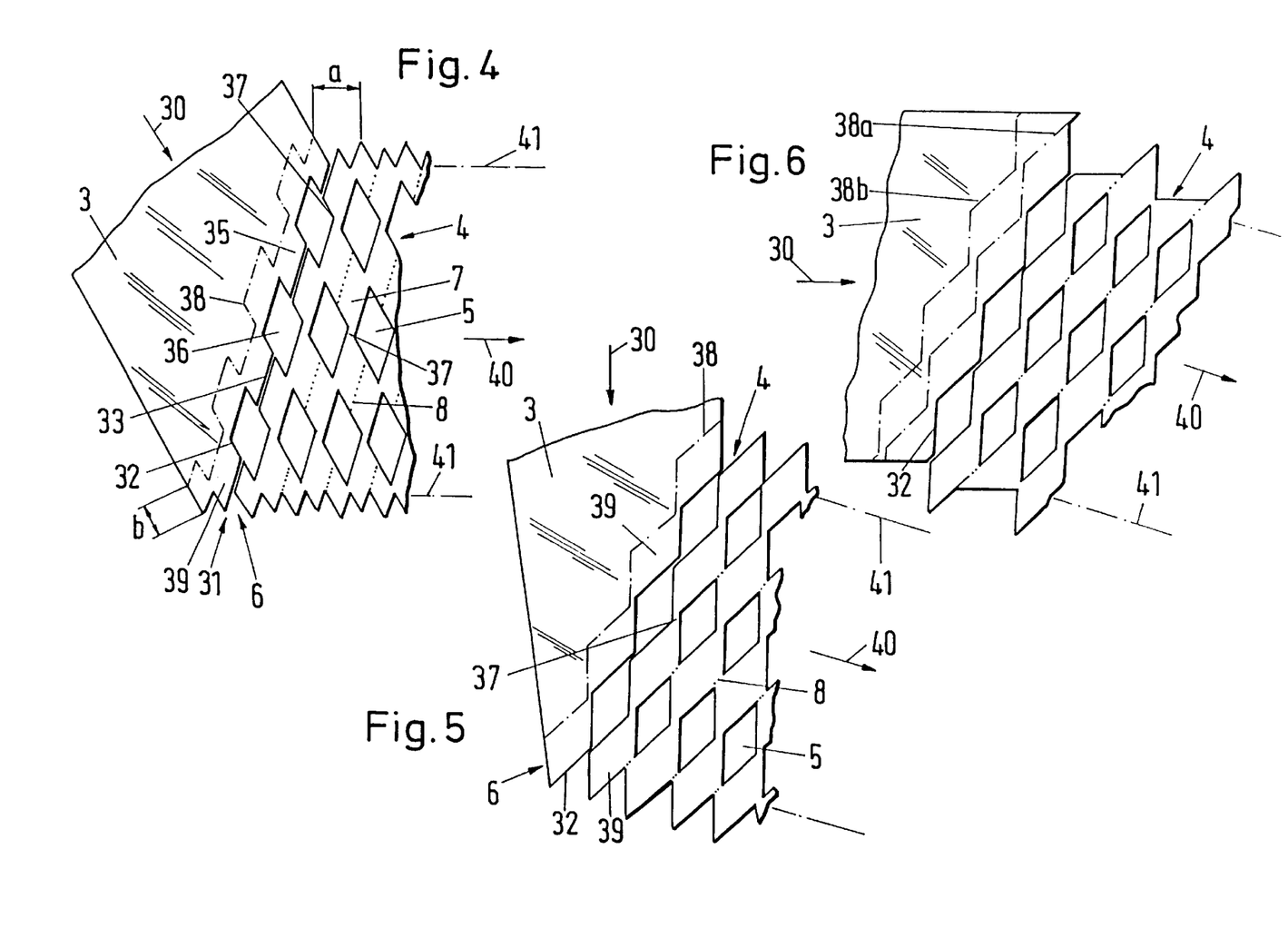
FIG. 4 shows production of a foil with apertures according to the invention in which the teeth of the cut edge are rhombic.
FIG. 5 shows a further production and a first example with a zigzag-shaped cut edge and teeth, which make an angle of 120°.
FIG. 6 shows a further production and a second example with a zigzag-shaped cut edge and teeth, which make an angle of 120°.

FIG. 4 shows how a flat structural element 4 with rhombic openings 5 according to the invention may be made from a sheet-like or foil-like starting material 3.

The arrows 40 and 30 indicate the advance of the flat starting material 3 and the strips 6 of flat material formed by cuts, which takes place in steps by step lengths a or b.

On the cut front 31 meet the starting material 3 and a strip 6 of flat material separated by a cut. The cutting line 32 extends such that a tooth-shaped pattern with rhombic teeth 35 and gaps 36 is formed. On the mutually opposite end faces 33 of the teeth 35 is made a connection, e.g. by welding.

The cutting line produced in the next working step is shown by a dash-dotted line at 38, i.e. the produced strip 6 of flat material is delimited by the cutting lines 32 and 38 and consists of a row of rhombuses 39 connected to each other at the vertices. The connection bridges are alternately at the vertices with the obtuse or acute angles of the rhombuses 39.

The flat structural element 4, obtained by the cuts, the displacement and the connection of the strips 6 of flat material, contains closed partial face elements 7 and openings 5. It is at the lateral margins serrated, but the serrations may be cut off along the marginal lines 41. It may, however, be advantageous to leave the serrations on one side and use them in a packing made up of such flat structural elements in a mass exchange column as drip-off elements.

The connecting seams 8 between the individual strips 6 of flat material may be made by welding or soldering and produced fully automatically.

In the embodiment according to FIG. 5 the cutting line 32 (or 38) is zigzag-shaped. The individual sections or parts of this zigzag-shaped cutting line are of identical length and make an angle of 120°. It should be mentioned that this angle may also be of a different size, but should preferably lie in the range between 110° to 150°. The strip 6 of flat material situated between the cutting lines 32 and 38 has again the shape of a chain of rhombuses 39, which are connected to each other at vertices. The connection bridges 37 are in this case situated always at the acute angles. Connection seams 8, produced by welding or soldering, produce from the strips 6 of flat material the desired flat structural element 4 with the openings 5.

FIG. 6 explains the variant of the manufacturing method according to FIG. 5 which produces substantially the same flat structural element 4, while, however, the advance direction 30 of the starting material 3 is turned through 90° with the same advance direction 40 of the flat structural element 4.

The difference is obtained in that a cutting line 38a and a cutting line 38b are produced alternately and are displaced with respect to each other by half a tooth length in the direction of the cut front 31. The cutting line 32 corresponds to the cutting line 38b.

Figure 7:
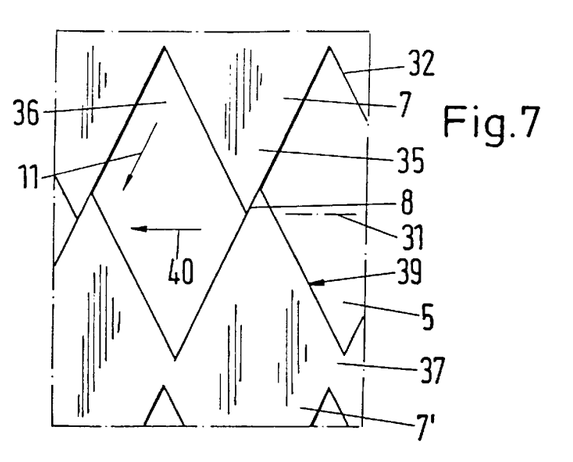
FIG. 7 shows a zigzag-shaped cut edge and teeth, which make an angle of 60°.
Figure 8:
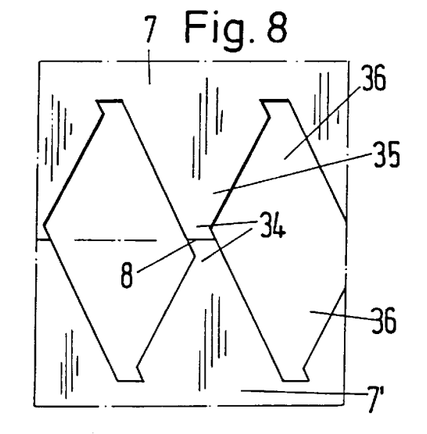
FIGS. 8–11 show variant forms of the cut edge shown in FIG. 7.
Figure 9:
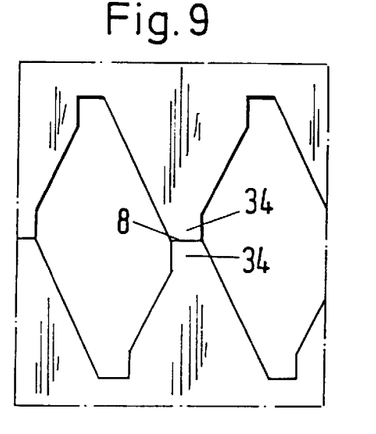

FIG. 7 shows an embodiment of the invention in which the cutting line 32 is formed using a zigzag-shaped line with the teeth 35 and gaps 36. The individual line segments are of equal length and subtend always an angle of 60°. This angle may, however, be of a different size, but lies preferably within the range between about 30° and 70°.

The closed partial face elements 7 and 7', which are shown only as cut-outs, are again in the form of chains of rhombuses 39 connected to each other at the vertices, but in this case the connecting bridges 37 are situated at the vertices with obtuse angles.

Because the partial face element 7' is moved over from the cutting line 32 in the direction of the arrow 11, rhombic openings 5 result. In this process the new connection seams 8 are produced along the mutually adjacent segments of the cutting lines. During the production of the flat structural element 4 the advance direction (arrow 40) extends parallel to the cut front 31 of the closed partial face elements 7, 7'.

In the variants illustrated in FIGS. 8 to 11 of the embodiment shown in FIG. 7, the teeth 35 have on their vertices always a short cut-off piece 34, two such cut-off pieces 34 forming a connection region. In this region may be performed soldering or welding with or without an overlap. Alternatively a mechanical fold-clamp connection may be made in this region.

When the obtained flat structural element is folded in a zigzag fashion, the folding lines may be so chosen that they extend through the connection regions between the strips of flat material, which is particulary advantageous in the case, when these strips 6 of flat material are connected to each other by fold-clamp connections, because in that case stiffening and strengthening of this special connection may be obtained by the folding edge needed for the making of the zigzag structure, this being the case particularly when, according to a special embodiment of the invention, the folding edge and the folding connection extend at an angle with respect to each other.

Figure 10:
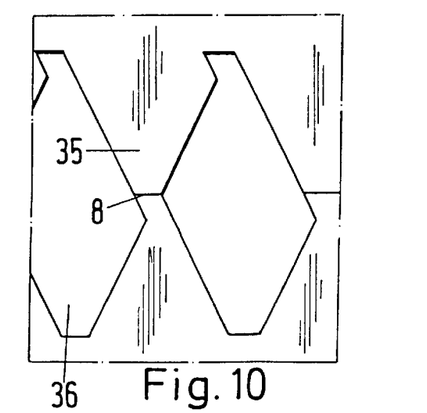
Figure 11:
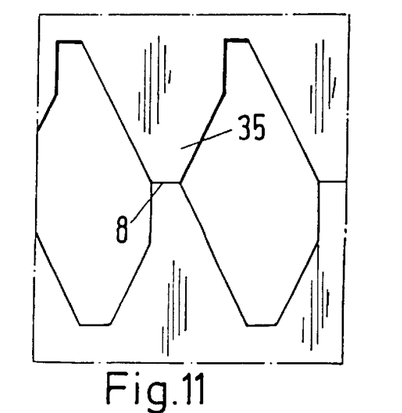

In FIGS. 10 and 11 is shown an asymmetrical variant; in this embodiment the provided folding edge does not extend over the connection seam 8. In the embodiments shown in FIGS. 8 and 10 hooking obtains between the teeth 35 and the gaps 36 as long as the connection seams 8 have not yet been made.

The production of cuts extending in correspondence with the cutting lines 32, 38 may be made by mechanical or non-mechanical means.

Examples of mechanical methods are:

Stamping by an oscillating stamping tool, scissor-type severing by profiled knives or contour sawing by a wire saw.

Examples of non-mechanical cutting methods are:

Water-jet cutting, laser cutting, microplasma or gas flame and also wire erosion.

Methods in which wire saws or wire erosion are used are suitable particularly in cases when several foils or metal sheets positioned one on top of the other are to be cut simultaneously.

For the making of the connections between the strips 6 of flat material, either mechanical methods or also welding, soldering or gluing by adhesives maybe used.

For the mechanical connections the following examples may be given:

Rivetting with or without additional material, cramping with or without additional material, snap-fastening connection or fold-clamping connections.

Advantageous welding methods include:

Microplasma welding or laser welding, resistance seam welding or resistance spot welding.

For various ones of the mentioned connection methods it is not necessary to provide any flat overlappings for the connection places or connection regions.

Figure 12:
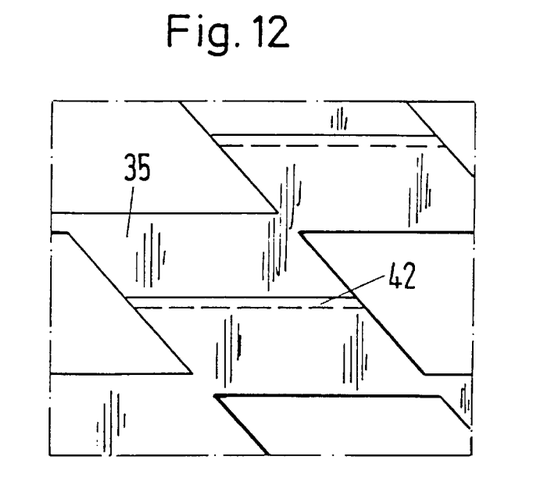
FIG. 12 shows a strip-shaped overlapping of the connection places for the embodiment shown in FIG. 4.
Figure 13:
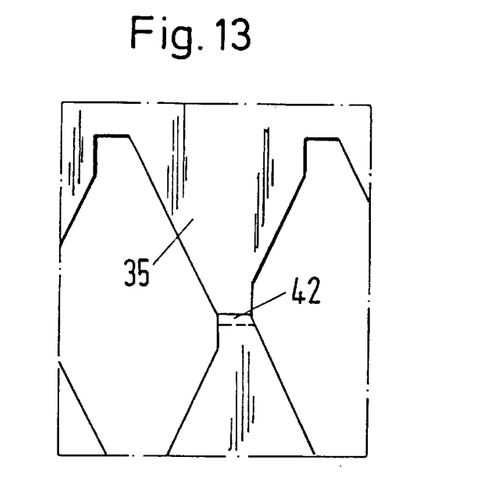
FIG. 13 shows a strip-shaped overlapping of the connection places for the embodiment shown in FIG. 9.
Figure 14:
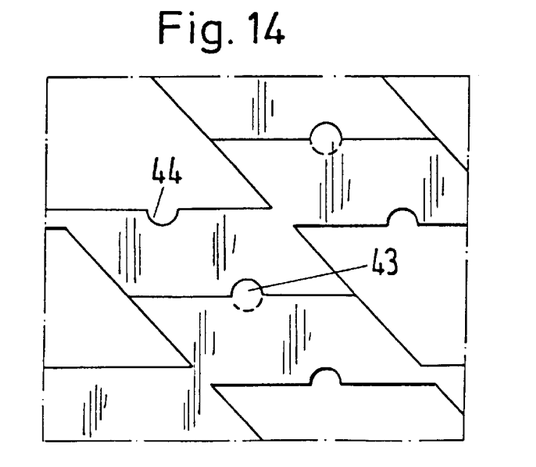
FIG. 14 shows overlapping of the connection places in the form of a small circular area for the embodiment shown in FIG. 4.
Figure 15:
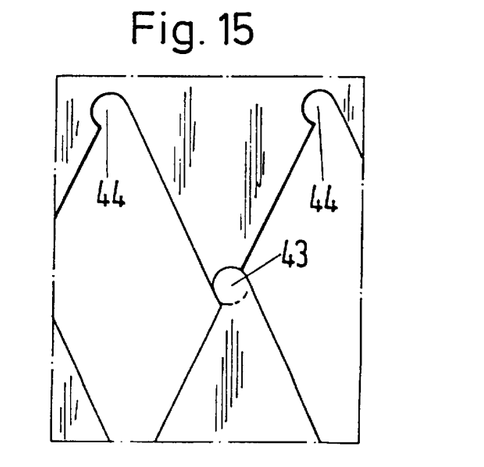
FIG. 15 shows overlapping of the connection places for the embodiment shown in FIG. 7.

FIGS. 12 and 13 show strip-shaped overlappings 42 and from FIGS. 14 and 15 are apparent dot-shaped overlappings 43. Correspondingly semicircular recesses 44 are provided in the starting material.

Figures 16, 17:
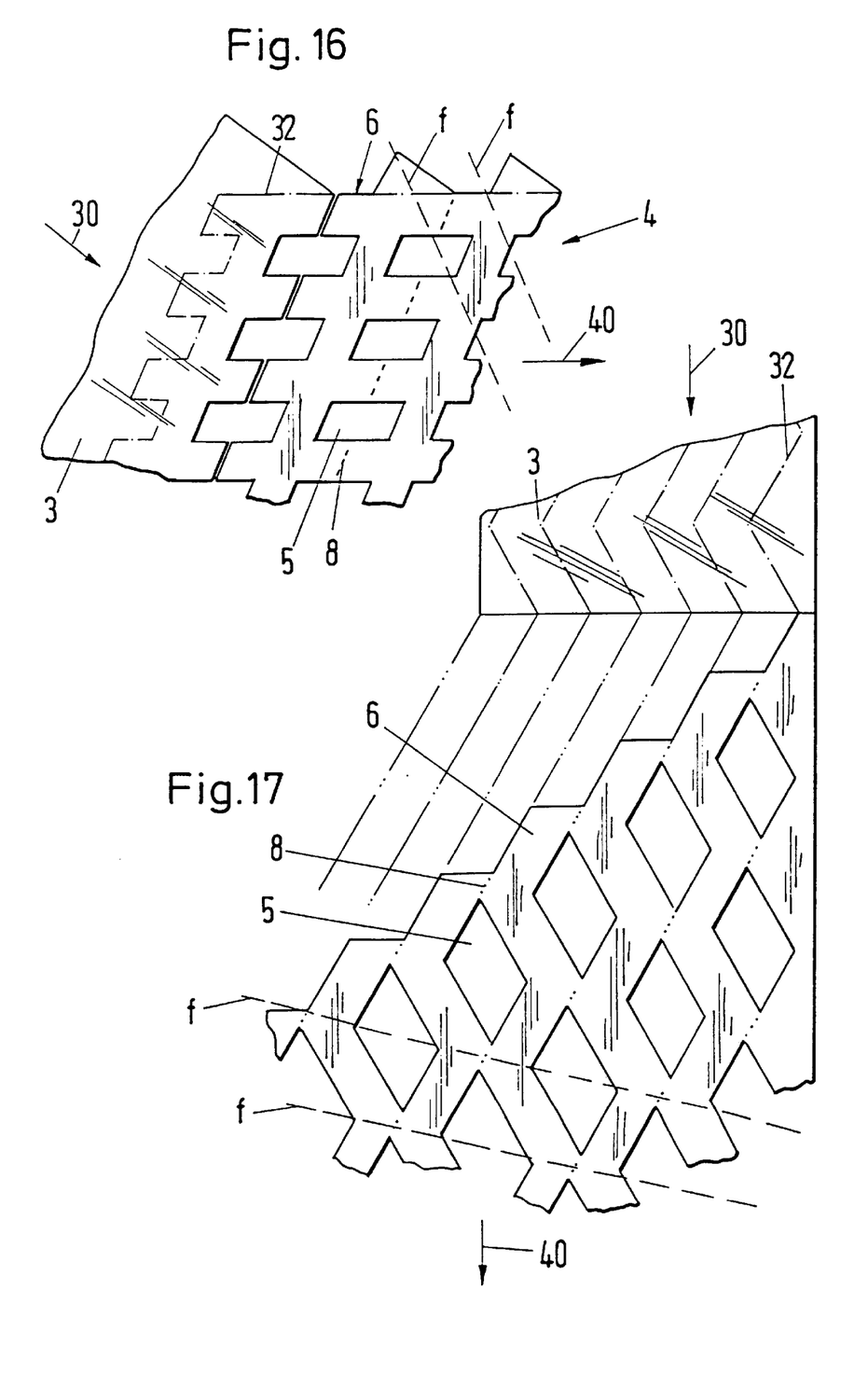
FIG. 16 shows a diagrammatic representation for the explanation of a further example of production of a flat structural element according to the invention, in which the openings are rectangular.
FIG. 17 shows a representation for the explanation of a further variant for the production of a flat structural element according to the invention.

FIG. 16 shows a further variant of the production of a flat structural element according to the invention provided with rectangular openings 8 which are obtained by the use of meander-shaped cutting lines 2. As in the case of the embodiments described so far, the flat structural elements 4 are produced without any loss of material, because the strips 6 of flat material, made by specially extending cuts, are connected together displaced with respect to each other such that openings 5 are formed.

So as to produce from the obtained flat structural element 4 a three-dimensional structural element suitable particularly for use in vortex packings, the flat structural element 4 is deformed preferably in a zigzag manner according to folding lines f, as is shown by way of example in FIG. 16. The extension of the folding lines may be so selected that optimum total structures, as regards the desired fluid and gas guidance and on the other hand stability increasing strengthening of the structural elements are obtained.

FIG. 17 shows diagrammatically a variant of a production method in which the cutting lines 32 do not extend in the transverse direction of the starting material 3, but in its longitudinal direction, and consequently mutual displacement of the strips 6 of flat material may be made in the same direction as the advance direction 30 of the starting materials.

A significant advantage of the invention is that the relevant structural element may be produced in different ways which ensures adaptation to the production possibilities determined by the operation.

Figure 18:
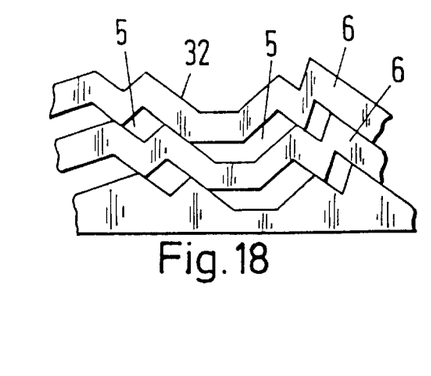
FIG. 18 shows a section of a representation of a variant of a flat structural element with varying openings.
Figure 19:
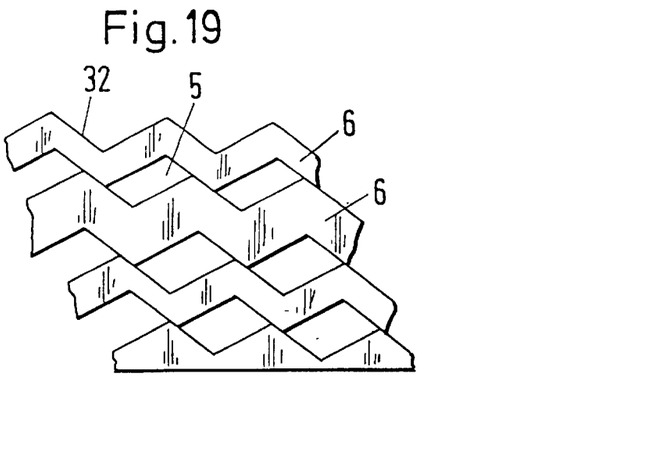
FIG. 19 shows a partial representation of a flat structural element of different strips of flat material.
Figure 20:
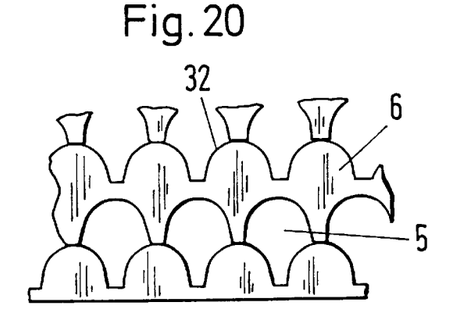
FIG. 20 shows a diagrammatic partial representation of a flat structural element with openings delimited by curved edges.

FIGS. 18 to 20 show further examples of flat structural elements according to the invention.

FIG. 18 shows that the cutting lines 32, while preserving a periodicity, may be selected to be so irregular, that after mutual displacement of the formed strips 6 of flat material and their new connection, openings 5 of diverse shape and size result, which may be of considerable advantage in many applications.

FIG. 19 shows a cut-out of a flat structural element which is composed of zigzag-shaped strips of flat material, the strips 6 of flat material being of different width so that over the whole area of the structural element a desired deviation from perfect regularity is achieved, as regards distribution and possibly also size of the openings 5, which gives advantageous results also in connection with crease folds.

The example according to FIG. 20 shows that the cutting line 32 may also have curved segments and in this way openings 5 are obtained which have a very special shape and may also be adapted to special conditions.

Figure 21:
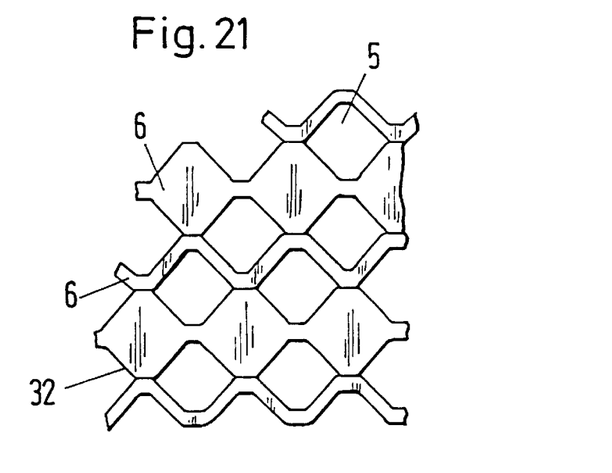
FIG. 21 shows a further diagrammatic partial representation of a flat structural element of two different kinds of strips of flat material.

Also, in the embodiment shown in FIG. 21, the strips 6 of flat material are cut without losses from a sheet-like starting material. Due to the chosen extension of the cutting lines 32 two different shapes of strips of flat material are formed, namely a relatively narrow, undulating strip of flat material and a strip of flat material which has wide and narrow portions. The strip having wide and narrow portions is always situated between two said narrow strips and is produced by wavy extension of the cutting lines during cutting of the flat strips. By corresponding displacement and new connection of the strips of flat material, the openings 5 are formed in the manner described.

Figure 22:
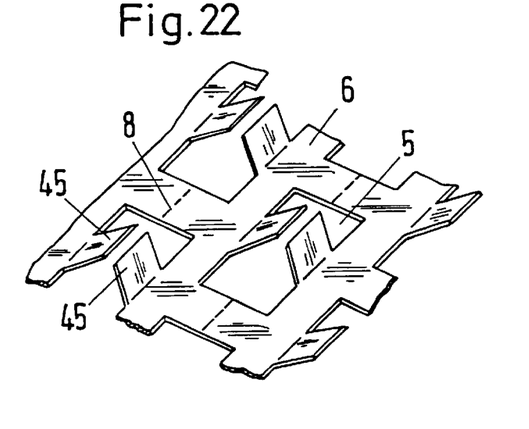
FIG. 22 shows a diagrammatic partial representation of a flat structural element with partly three-dimensionally deformed partial regions.

FIG. 22 shows diagrammatically the principle (applicable also in different embodiments of flat structural elements) of use of flat material strips which are made three-dimensional along portions of their lengths. In the embodiment shown in FIG. 22 the three-dimensional deformation is obtained by the deflection of web portions in the same direction or alternately in opposite directions, but this three-dimensional deformation of portions may also be achieved by twisting portions of the strips 6 of flat material.

Figure 23:
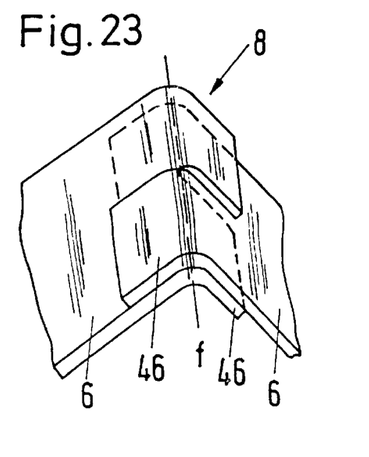
FIG. 23 shows a diagrammatic partial representation of a fold-clamp connection between two strips of flat material.

FIG. 23 shows an example for the fold-clamp connection between two strips of flat material. For this purpose opposite random regions of strips of flat material are slit in a preselected connection region and the flaps formed in this way are interengaged. This clamp connection is fixed by the formation of a folding edge according to the dashed line f.

From the flat structural elements according to the above-shown and explained examples may be particularly advantageously produced packings, particularly vortex packings according to the basic principle explained with reference to FIG. 1. The starting material may be metallic or made of plastics. It may have a structured surface, e.g. surface with fine grooves. In addition it may be perforated by holes whose diameter is much smaller than that of the additionally formed openings. The cutting lines themselves may be smooth or serrated.

It was found to be advantageous when making a vortex packing to provide each of the closed partial face elements, which still remain in the flat structural elements, with a further opening, while the diameter of these openings should be at least 2 mm but not more than about 4 mm.

A packing made according to the invention has various possibilities of application of which the following are mentioned by way of example:

The use in a mass exchange and/or heat exchange column between a trickle film and a gas stream, while horizontal grooving of the structural elements may be used to achieve uniform wetting.

Use in a reactor in which the packing is made as a carrier for a catalyst, or use in a static mixer for fluid media.

Figure 24:
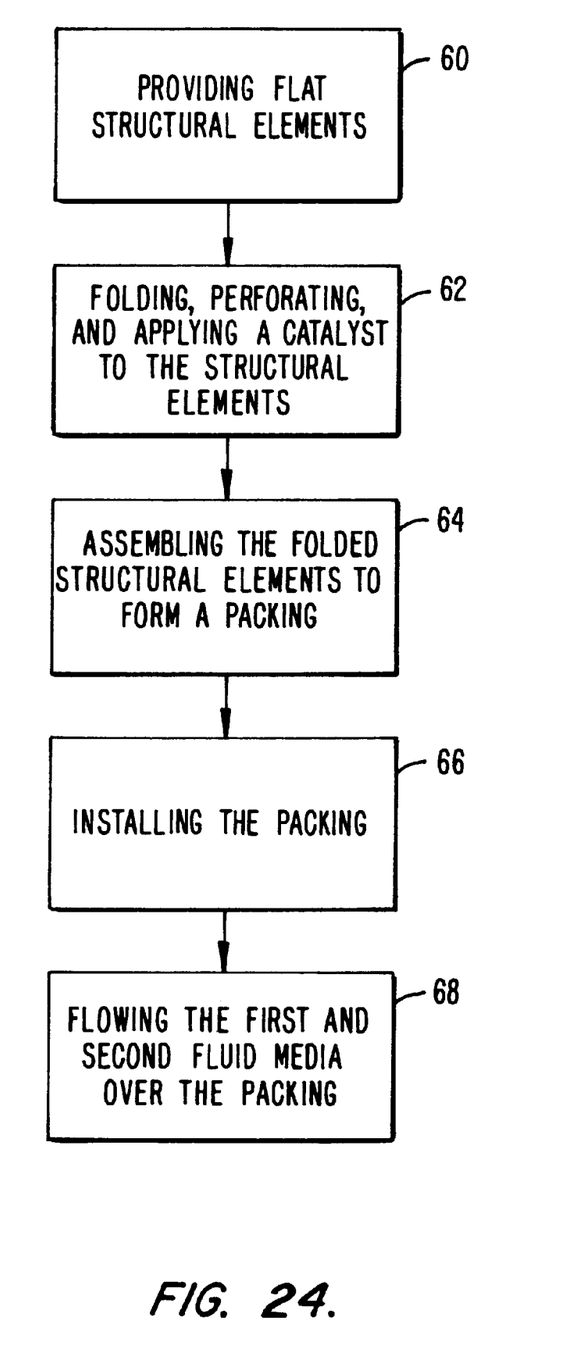
FIG. 24 is a flow chart illustrating steps of a method in accordance with the present invention.

FIG. 24 is a flow chart summarizing the basic steps of a method of operating a mass exchange, a heat exchange column or a static mixer in accordance with the present invention. Step 60 recites the step of providing flat structural elements and step 62 recites folding, perforating and applying a catalyst to the structural elements. Step 64 recites assembling the folded structural elements to form a packing, step 66 recites installing the packing and step 68 recites flowing the first and second fluid media over the packing.

Figure 25:
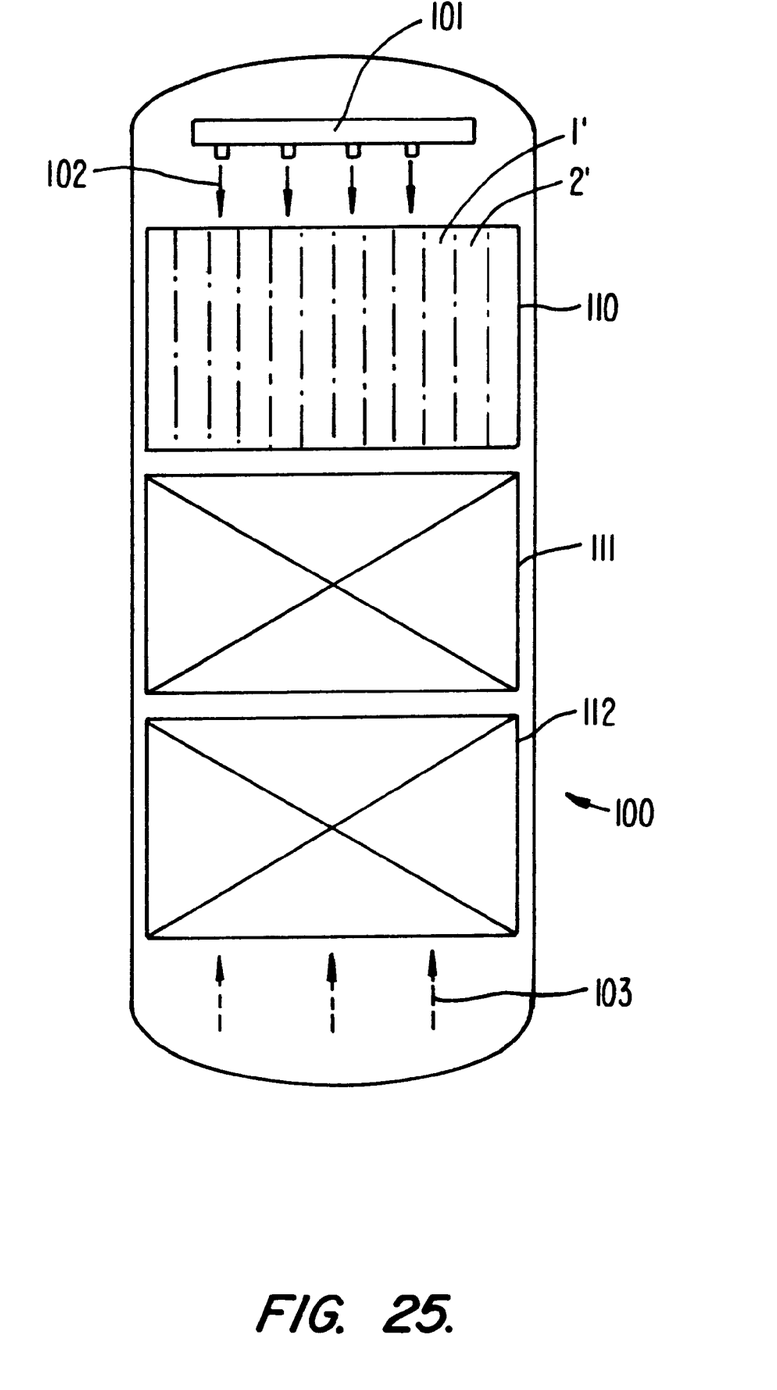
FIG. 25 is an elevation view of a column including packing in accordance with the present invention.

FIG. 25 illustrates a column 100 with a distributor 101 for liquid represented by arrows 102. The packing comprises three portions 110, 111 and 112. A gas stream is represented by arrows 103. Portions 110, 111, and 112 are composed of layers 1' and 2'.

What is claimed is:

1. A method of operating at least one of either a mass exchange, a heat exchange column, or a static mixer comprising the steps of:

providing a packing, assembly of the packing comprising the steps of:

providing at least one flat, structural element including a plurality of separate, adjoining strips of a sheet material, each strip having first and second, spaced-apart longitudinal edges, the longitudinal edges of adjoining strips being placed opposite each other, the adjoining strips being in contact with and secured to each other where they contact each other to provide the flat structural element with structural stability, the longitudinal edges of the strips including a plurality of repetitively spaced-apart recesses of a predetermined shape, and the recesses in longitudinal edges being opposite each other to define a multiplicity of repetitively arranged openings distributed over the structural element;

folding at least some of the structural elements along fold lines to give the folded structural elements a zigzag shape in a cross-section transverse to the fold lines; and assembling the folded structural elements into layers to thereby form the packing;

installing the packing in an apparatus; and flowing a trickle film and a gas stream over the packing.

2. A method according to claim 1 including the step of forming horizontal grooving in the structural elements of the packing, and using the horizontal grooving to facilitate uniform wetting.

3. A method according to claim 1 including the step of forming a perforation in the structural elements, and using the perforation to facilitate uniform wetting.

4. A method according to claim 1 including the step of forming surfaces of the structural elements as a catalyst.

5. A method according to claim 4, wherein the step of forming comprises the step of applying a catalyst to the structural elements.

6. A method of operating a static mixer for fluid media comprising the steps of providing a flat, structural element including a plurality of separate, adjoining strips of a sheet material, each strip having first and second, spaced-apart longitudinal edges, the longitudinal edges of adjoining strips being placed opposite each other, the adjoining strips being in contact with and secured to each other where they contact each other to provide the flat structural element with structural stability, the longitudinal edges of the strips including a plurality of repetitively spaced-apart recesses of a predetermined shape, and the recesses in longitudinal edges being opposite each other to define a multiplicity of repetitively arranged openings distributed over the structural element, folding at least some of the structural elements along fold lines to give the folded structural elements a zigzag shape in a cross-section transverse to the fold lines, assembling the folded structural elements into layers to thereby form a packing, installing the packing in the exchange column, and flowing first and second fluid media over the packing.

* * * * *